United States Patent [19]

Deibel et al.

[11] 3,885,265
[45] May 27, 1975

[54] WINDSHIELD WIPER BLADE ASSEMBLY

[75] Inventors: Raymond A. Deibel, West Falls; William F. Kuebler, East Aurora, both of N.Y.

[73] Assignee: Trico Products Corporation, Buffalo, N.Y.

[22] Filed: Feb. 11, 1974

[21] Appl. No.: 441,506

[52] U.S. Cl. .......................................... 15/250.42
[51] Int. Cl. ............................ B60s 1/04; B60s 1/38
[58] Field of Search .................. 15/250.36–250.42

[56] References Cited
UNITED STATES PATENTS

| 2,706,305 | 4/1955 | Oishei | 15/250.42 |
| 2,792,585 | 5/1957 | Scinta | 15/250.42 |
| 3,626,544 | 12/1971 | Lopez et al. | 15/250.42 |
| 3,667,083 | 6/1972 | Linker | 15/250.42 |
| 3,769,653 | 11/1973 | Lopez | 15/250.42 |
| 3,820,188 | 6/1974 | Moorhead et al. | 15/250.42 |

Primary Examiner—Peter Feldman
Attorney, Agent, or Firm—E. Herbert Liss

[57] ABSTRACT

A replaceable squeegee assembly or refill unit for a windshield wiper blade incorporates a universally adaptable backing strip for supporting a rubber-like squeegee element. The backing strip may be integrally formed of molded or extruded plastic material and includes a pair of spaced-apart side rails attached to a squeegee holder in the form of a channel-shaped body by a pair of resiliently flexible legs so that the spacing between the outer longitudinal edges of the side rails can be varied independently of the squeegee holder to fit wiper blade pressure distributing superstructures having pairs of opposed blade straddling claws spaced apart different widths.

9 Claims, 6 Drawing Figures

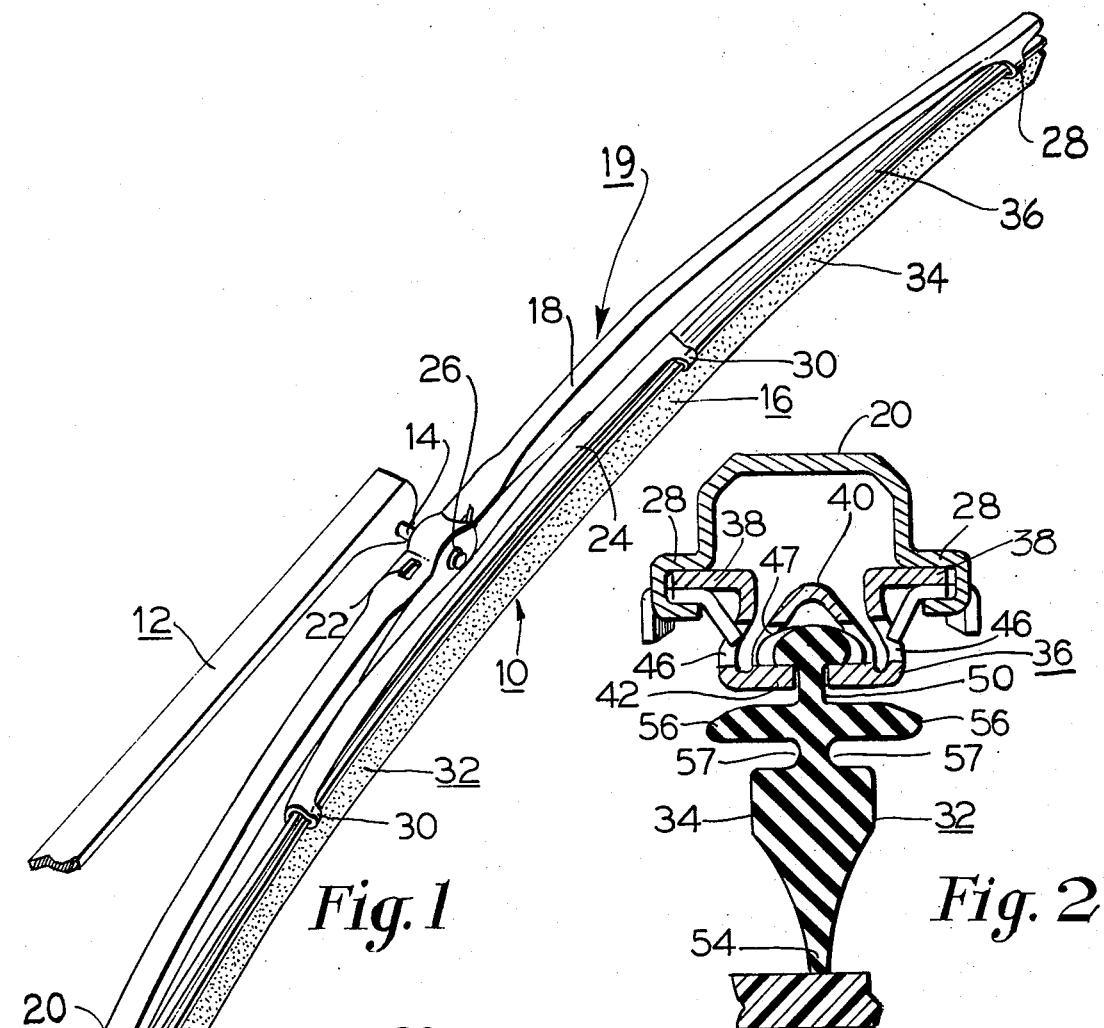
Fig. 1
Fig. 2
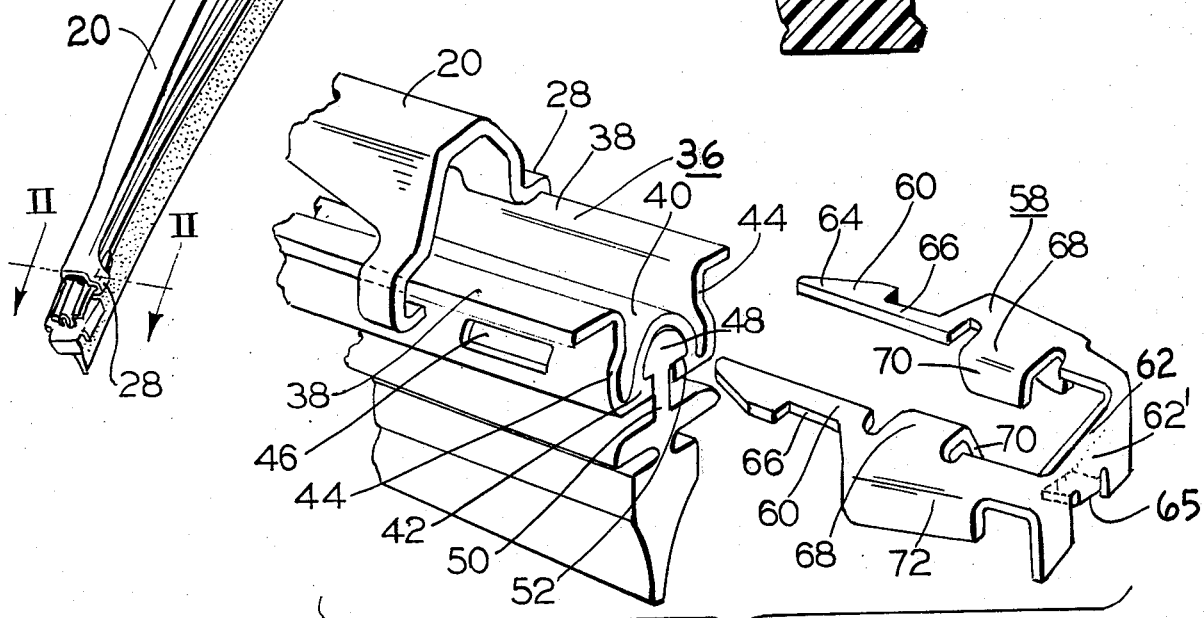
Fig. 6.

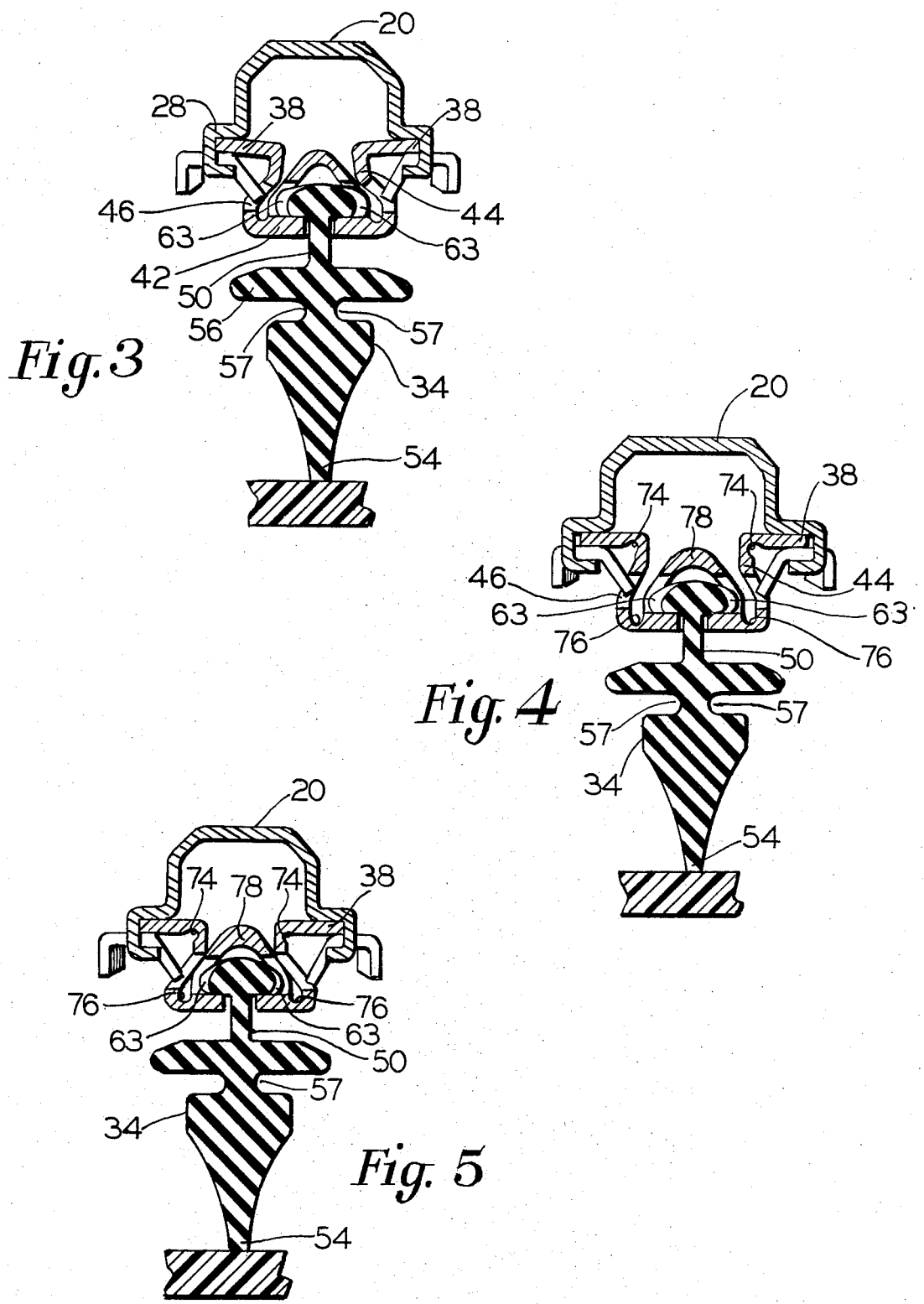

WINDSHIELD WIPER BLADE ASSEMBLY

BACKGROUND OF THE INVENTION

The present invention relates to replaceable refill units for wiper blades and more particularly to an adjustable and universally usable backing strip for a refill unit.

Current wiper blade assemblies for both original equipment and replacement blades include flexible pressure distributing superstructures comprising a plurality of articulated levers having pairs of opposed blade straddling claws to slidably retain a replaceable wiping assembly or refill unit including an elastomeric squeegee element and backing strip or support therefor. Blade straddling claws on superstructures of different sizes, different designs and blades made by different manufacturers vary in width rendering it difficult and in some cases impossible to provide a suitable universal replaceable wiping assembly or refill unit. In attempts to overcome this problem refill units have been supplied together with a sizing gauge and directions to spread or compress the blade straddling claws with the aid of the sizing guage. In seeking to provide a universal refill, backing strips have been made in compromised widths which are not wide enough to properly fit the widest claws and so wide as to fit too snugly in the narrowest claws. Resilient clips such as that shown in U.S. Pat. No. 3,153,254 by E. W. Lenz et al., issued Oct. 20, 1964, which interlock with the backing strip and resiliently engage the claws of the superstructure have been used successfully to provide universal refills in a limited range of blade widths. Another scheme to provide a universal refill element utilizes two separate unattached side rails receivable in longitudinal grooves of the elastomeric element. The rails are held together by clamps or staples. These do not provide the support for the squeegee necessary to produce a clean wipe and furthermore are awkward to assemble.

SUMMARY OF THE INVENTION

According to the present invention a backing strip is provided which may preferably be of molded or extruded plastic and which includes a channel shaped body portion for receiving the longitudinal anchoring bead of an elastomeric wiping element. A pair of coplanar spaced-apart side rails are attached to the body member through resiliently flexible legs to permit variation of the distance between the outer longitudinal edges of the side rails. The movement of the side rails is substantially independent of the body member and causes no or, at most, negligible distortion of the body. The co-planar relationship between the side rails is not materially affected. For blade superstructures having a relatively narrow width between the blade straddling claws the rails can be compressed and inserted and for the widest blade straddling claws the blades can be freely inserted. In either case there is sufficient sliding relationship without excessive looseness between the claws and the backing strip to permit conformance of the blade to a curved windshield.

It is the principal object of the present invention to provide a refill wiping unit for windshield wiper blades having an improved universally adaptable backing strip assembly for use in a variety of superstructures having claws of various widths.

Another object of the invention is to provide an improved refill unit for windshield wiper blades incorporating a backing strip adapted for universal use in superstructures having claws of various widths which can be readily removed and replaced without the use of tools and which permits proper slidability in the claws of the superstructure.

Other objects and advantages of the invention will be apparent from the following detailed description taken in connection with the accompanying drawings.

DESCRIPTION OF THE DRAWINGS

FIG. 1 is a perspective view of the invention incorporated in a windshield wiper blade assembly;

FIG. 2 is a lateral cross section taken on line II—II of FIG. 1 with the backing strip in its widest condition;

FIG. 3 is a lateral cross section similar to FIG. 2 showing the side rails of the backing strip compressed for a narrow clawed superstructure;

FIG. 4 is a lateral cross section similar to FIG. 2 illustrating a modified embodiment of the invention;

FIG. 5 is a lateral cross section similar to FIG. 3 illustrating the embodiment of FIG. 4; and FIG. 6 is an exploded partial perspective view.

DETAILED DESCRIPTION

In FIG. 1 there is shown a wiper arm and blade assembly 10 which includes a wiper arm 12 having means at one end (not shown) for securing it to an oscillatable pivot shaft and a blade attachment pin 14 at its outer end. A wiper blade assembly 16 includes a superstructure 19 comprising primary levers 18 and 20 pivotally secured together at their inner ends and biased to conformance with the windshield by a coil spring 22. A secondary lever or yoke 24 is pivoted at its center to the axis between levers 18 and 20 and a latching receptor is provided at 26 to pivotally receive the pin 14 in latching engagement. The levers 18 and 20 have pairs of opposed blade straddling claws 28 formed at their outer ends. The claws are substantially U-shaped in cross section. Similar pairs of claws 30 are provided at each end of the secondary lever or yoke 24. A wiping assembly or refill unit 32 comprising an elastomeric or rubber-like wiping element or squeegee 34 and a backing strip or support 36 for the wiping element is received in the pressure distributing superstructure 19 with a pair of side rails 38 of the backing strip slidably received between the pairs of opposed claws 28 and 30.

The backing strip 36 may be integrally molded or extruded of suitable resiliently flexible plastic material; it includes an elongate body 40, channel-shaped in cross section, having inwardly extending flanges 42 at its open side. A pair of co-planar elongate side rails 38 extend longitudinally along the length of the body 40 and are laterally spaced apart; they are disposed on opposite sides of the body 40. The plane of the side rails 38 may overlie the upper surface of the body 40 as illustrated. Resiliently flexible legs 44 depend from the side rails 38 and are flexibly and resiliently connected to the body 40. Preferably the legs 44 depend from the inner longitudinal edges of the side rails and may be connected at the free ends of the legs to the channel-shaped body 40. It will of course be understood that in accordance with the broader aspects of the invention the flexible legs may depend from a line spaced from the inner longitudinal edges and may be connected to the body 40 at a line displaced from the free ends of the legs thereof. Furthermore the backing strip may be of other suitable resiliently flexible material and may be formed by any suitable method. Adjacent an end of each leg 44 there is formed therein a window 46, and a pair of windows 47 are provided adjacent each end of the body member 40, one window 47 being formed in each leg of the body member at each end for a purpose to be explained hereinafter. It can thus be seen that a backing strip or support 36 has been provided which has less flexibility in a plane parallel to the surface to be wiped than in a direction perpendicular thereto and in which the pair of spaced-apart side rails 38 are movable toward and away from each other to increase or decrease the distance between the outer edges thereof so as to accomodate superstructures having opposed claws of various widths. Flexing of the legs 44 to effect lateral movement of the side rails 38 is substantially independent of the body 40 and has negligible, if any, effect on the spacing between the free ends of the flanges 42. If as a result of such movement the side rails should be slightly displaced from coplanar relationship, the displacement would be so small as to have negligible, if any, effect on operation of the wiper. To accomodate most or all of the superstructures currently in commercial use the distance between the outer edges of the side rails 38 would vary approximately 0.050 inches.

The wiping element or squeegee 34 comprises an elongate strip of elastomeric or rubber-like material and may be of any of the well known shapes commonly employed. It includes an anchoring bead 48 extending along one longitudinal edge connected by a reduced neck portion 50 to the body portion. The anchoring bead 48 at its junction with neck portion 50 forms downwardly facing shoulders 52. Along the opposite longitudinal edge is a wiping lip 54. The body portion is generally triangularly shaped in cross section, the wiping lip forming the apex of the triangle. Intermediate the body portion and the anchoring bead there may be a pair of shoulders 56 extending laterally from opposite sides of the neck portion forming longitudinal grooves 57 on each side of the blade. An abutment is formed on the anchoring bead adjacent each end thereof and extends laterally from each side to form engaging lugs 63 on each side. The anchoring bead 48 is slidably received within the channel-shaped body 40. It is retained therein by engagement of the shoulders 52 with the flanges 42 and is restrained against longitudinal displacement by engagement of lugs 63 in windows 47. The combination of backing strip 36 and wiping element 34 constitute a universal refill unit 32.

A clip 58 which may be of plastic, metal or other suitable resilient material is provided to retain the wiping assembly 32 latched in the superstructure 19. The clip 58 is of U-shaped configuration comprising a pair of legs 60 flexibly and resiliently connected together by a web 62 having a depending flange 62'. A tongue 65 struck out from the flange 62' projects inwardly in the direction of the legs 60. The legs are tapered at their free ends as at 64 for camming engagement with the claws 28. The legs include notches 66 having opposed shoulders which extend laterally beyond the outer longitudinal edges of the backing strip so as to resiliently engage the claws and to restrain the wiping assembly from longitudinal displacement in either direction by engagement of the web of the U-shaped claws with the opposed shoulders when in assembled condition. Extending inwardly from the legs 60 intermediate the notches 66 and the web 62 are a pair of opposed flanges 68 having downturned tabs 70 chamfered at the forward corners. At each outer edge of the leg intermediate the notch 66 and web 62 may be a depending flange 72 for providing a surface to actuate the clip 58. The clip 58 is disposed with its legs 60 straddling flexible legs 44 of the backing strip 36 and underlying the side rails 38. The tabs 70 engage the windows 46 to retain the clip 58 in assembled condition with the refill unit 32. The tongue 65 enters body 40 to align and stabilize clip 58.

The refill unit 32 is assembled by sliding the anchoring bead 48 into the channel-shaped body 40 whereupon the legs 60 of the clip 58 are positioned to straddle the end portion of the flexible legs 44 of the backing strip 36; then sliding the clip forward until the downturned tabs 70 on the flanges 68 engage the windows 46 adjacent the ends of the legs 44 of the backing strip 36 to securely hold the clip 58 on the refill unit 32. The tongue 65 on the depending flange 62' of the clip 58 enters the body 40 of the backing strip 36 to stabilize and align the clip 58 relative to the remainder of the refill unit. In the specific embodiment herein illustrated the clip 58 may constitute an element of the universal replaceable refill unit. It should be understood, however, that in accordance with the broader aspects of the invention other and different means may be employed for retaining the unit in assembled relationship with a superstructure.

To insert the refill unit 32 into the superstructure the side rails 38 of the refill unit are slid through the opposed pairs of claws 28 and 30 of the superstructure. The tapered surfaces 64 of the clip engage the claws compressing the legs until the notch 66 reaches the web portions of the pair of opposed claws 28 at which time the resilience of the legs 60 of the clip 58 cause the notches 66 to interlock with the webs of the pair of opposed claws 28. Removal of the refill unit 32 is accomplished by manually grasping the flanges 72 of the clip 58 and compressing the legs 60 to effect disengagement of the notches 66 from the webs of the pair of claws 28 whereupon the refill unit can readily be withdrawn from the superstructure.

A modified embodiment of the invention is shown in FIGS. 4 and 5. The refill unit shown in FIGS. 4 and 5 is substantially identical to the embodiment above-described with certain changes in the construction of the backing strip. For purposes of clarity and brevity only those changes will be described. It is desirable that the rails 38 have as much freedom to flex as is possible without sacrifice of adequate strength and resilience. It is also desirable that as the side rails move toward and away from each other they maintain as close to a co-planar relationship as is possible. A further desirable characteristic is elimination of any relative movement between the flanges 42 at the open end of the channel body 40 during flexure of the side rails 38 toward and away from each other. This latter requirement is important in order to avoid displacement of the blade rubber from the backing strip. As was pointed out hereinabove, with respect to the above-described embodiment there may be some, but negligible, displacement of the side rails from a co-planar relationship; very slight movement of the flanges 42 may also occur. In most every instance this movement would be ineffective to interfere with proper operation of the wiper blade. However, even less or probably no movement of the above-mentioned elements can be achieved by the embodiment illustrated in FIGS. 4 and 5.

In that embodiment the junction 74 between each of the side rails 38 and the flexible legs 44 are of reduced thickness in cross section. In addition the junctions 76 between the flexible legs 44 and the channel shaped body 40 may also be of reduced thickness. By means of this modification not only may the flexibility of the legs be increased but a parallelogram type movement may also be achieved to thereby retain the side rails 38 in co-planar relationship during flexure toward and away from each other. To further assure that the flanges 42 will remain stationary during flexure of the side rails toward and away from each other the web portion 78 of the channel-shaped body 40 may be of increased thickness in cross section relative to the remainder of the backing strip. It is apparent that the above-mentioned desirable effects will result to a greater or lesser degree by providing any one or more of the above-described modifications. That is, either the junctions 74 may be of reduced cross section or the junctions 76 alone may be of reduced cross section, the web 78 alone may be of increased cross section. Any one or more of these modifications can effect the above-mentioned desired results.

An improved refill unit having a unique backing strip which permits accomodation to various types and sizes of wiper blade superstructures has been shown and described embodied in a specific wiper blade construction. Thus there is provided a universal refill element which is readily removable and replaceable without the use of tools or other devices and which is simple and economical to manufacture.

Although certain specific embodiments of the invention have been shown and described for the purposes of illustration, it will be apparent that in accordance with the broader aspects various modifications and other embodiments are possible within the scope of the invention. For example, other and different types of latching arrangements for retaining the refill unit in the superstructure may be employed. Other and different types of materials may be used either for the squeegee element or the backing strip and the refill unit may be employed in other and different types of superstructures. Furthermore, other and different means may be employed to retain the squeegee element within the channel of the backing strip. It is, therefore, to be understood that the invention is not limited to the specific arrangement shown but in its broadest aspects it includes all equivalent embodiments and modifications which come within the scope of the invention.

What is claimed is:

1. For use in windshield wiper blade assembly including an elongate flexible pressure distributing superstructure having a plurality of pairs of laterally spaced apart opposed blade straddling claws and an elongate replaceable refill unit comprising an elongate squeegee element of elastomeric material and a flexible backing strip supporting said squeegee element the backing strip having less flexibility in a plane parallel to the surface to be wiped than in directions perpendicular thereto; said backing strip comprising a pair of substantially co-planar elongate side rails laterally spaced apart for slidably receiving said blade straddling claws, an elongate body, channel-shpaed in cross section, depending downwardly from said side rails for receiving said squeegee element, said channel having its open side remote from said side rails, and resiliently flexible means for connecting said side rails to said body member whereby the spacing between said rails can be varied, substantially independently of the body member, to fit between said pairs of laterally spaced apart blade straddling claws to accomodate superstructures having claws spaced apart different distances to thereby provide a replaceable refill unit universally adaptable to a variety of superstructures.

2. A backing strip according to claim 1 wherein said flexible means for connecting said side rails to said body member comprise a resiliently flexible leg depending from each of said side rails said leg being connected at its remote end to said elongate body.

3. A backing strip according to claim 2 wherein said side rails, said elongate body and said resiliently flexible legs are integrally connected, the junction between said body member and each of said resiliently flexible legs being of reduced thickness in cross section.

4. A backing strip according to claim 2 wherein the junction between each of said side rails and each of the corresponding resiliently flexible legs is of reduced thickness in cross section.

5. A backing strip according to claim 4 wherein the junction between said body member and each of said resiliently flexible legs is of reduced thickness in cross section.

6. A backing strip according to claim 1 of integrally formed plastic material.

7. A refill unit for a wiper blade assembly comprising an elongate squeegee element of elastomeric material and an integrally formed backing strip of plastic material for supporting said squeegee element and means for retaining said squeegee element in assembled relationship with said backing strip; said backing strip comprising a pair of spaced apart elongate side rails, a channel-shaped body member having its open side remote from said side rails and a flexible leg depending downwardly from each of said side rails connecting said side rails to said channel-shaped body member, said squeegee element comprising a wiping lip portion, an anchoring bead and a neck portion of narrower transverse width than the wiping lip portion and the anchoring bead and connecting them together, said body portion including a pair of opposed edges to retain the anchoring bead within the channel-shaped body portion.

8. A refill unit according to claim 7 wherein said means for retaining said squeegee element in assembled relationship with said backing strip comprises a pair of opposed windows on opposed legs of said channel-shaped body member adjacent an end thereof and said squeegee element includes a pair of shoulder portions each engaging a respective one of said windows.

9. A refill unit according to claim 7 including means for releasably retaining said refill unit in engagement with a pair of opposed claws on a windshield wiper blade superstructure comprising a bifurcated clip having a pair of legs resiliently connected together by a web, at least one of said legs including a notch on its outer edge having opposed shoulders extending laterally beyond the outer edge of the corresponding side rail, said legs underlying said side rails straddling said flexible legs and including an inwardly and downwardly directed tab, a window on at least one of said legs disposed for engagement with said inwardly and downwardly directed tab to retain said clip in assembled relationship with said refill unit.

* * * * *